United States Patent [19]
Butler et al.

[11] Patent Number: 5,685,399
[45] Date of Patent: Nov. 11, 1997

[54] HYDRAULIC BRAKE SLACK ADJUSTER

[75] Inventors: Ralph G. Butler, Matteson; Clifford E. Miller, Marseilles, both of Ill.

[73] Assignee: Caterpillar Inc., Peoria, Ill.

[21] Appl. No.: 640,324

[22] Filed: Apr. 30, 1996

[51] Int. Cl.$^6$ .................................................. F16D 65/38
[52] U.S. Cl. ............................. 188/196 A; 303/84.2
[58] Field of Search .................... 188/196 A, 72.4, 188/72.5, 79.51, 79.58, 79.62, 79.61, 196 B, 196 BA, 196 D; 303/84.2

[56] References Cited

U.S. PATENT DOCUMENTS

| | | | |
|---|---|---|---|
| 2,918,797 | 11/1959 | Oswalt | 188/196 A |
| 3,003,592 | 10/1961 | Kell | 188/79.51 |
| 3,637,054 | 1/1972 | Billeter | 188/196 A X |
| 4,319,671 | 3/1982 | Smith et al. | 188/196 A |
| 4,619,348 | 10/1986 | Smith | 188/196 A X |
| 4,802,559 | 2/1989 | Fourie et al. | 188/196 A |

*Primary Examiner*—Robert J. Oberleitner
*Assistant Examiner*—Pamela J. Lipka
*Attorney, Agent, or Firm*—J. W. Burrows

[57] ABSTRACT

A hydraulic brake slack adjuster disposed between a brake valve and an actuator of a brake mechanism has a first piston exposed to pressurized brake fluid from the valve and a second larger piston connected to the first piston for outputting brake fluid to the brake actuator with the fluid output to the actuator being greater than the volume of input fluid from the valve. This permits a smaller pump to be used while maintaining sufficient brake operation speed.

2 Claims, 1 Drawing Sheet

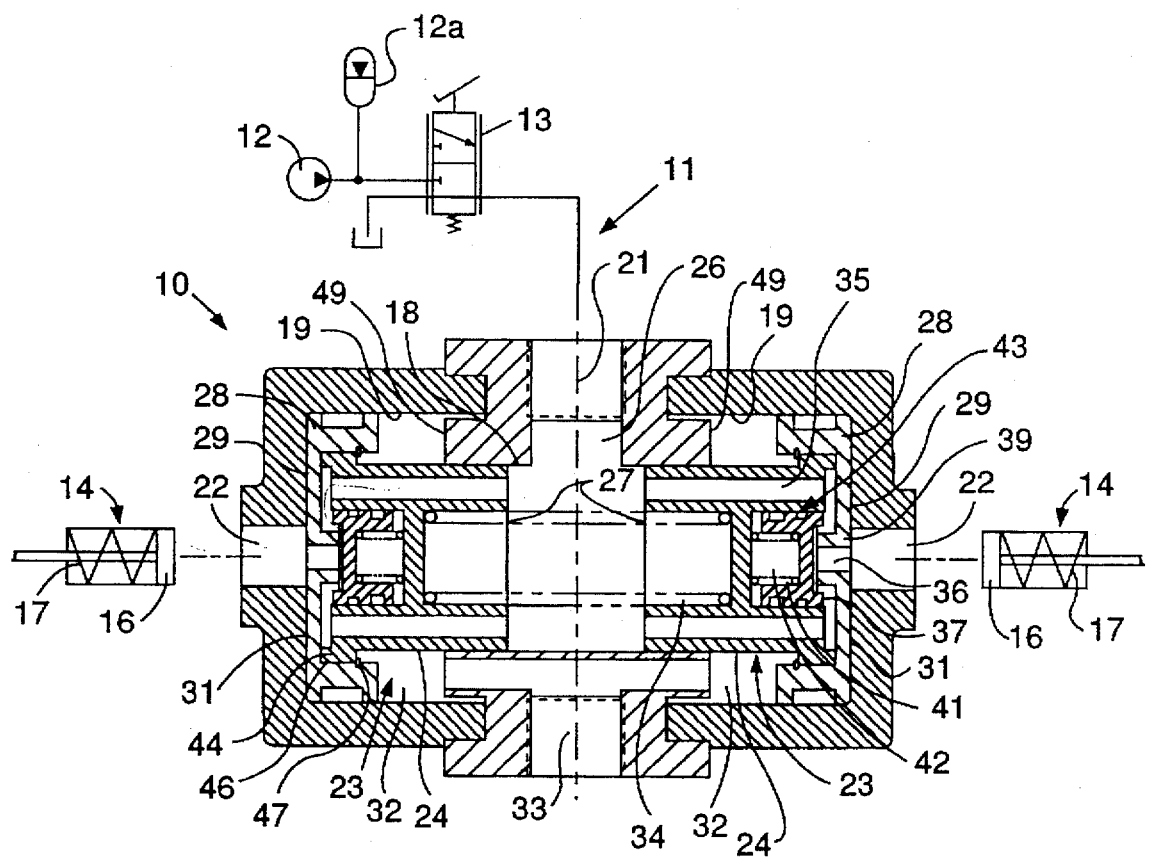

HYDRAULIC BRAKE SLACK ADJUSTER

TECHNICAL FIELD

This invention relates generally to a hydraulic brake slack adjuster and, more particularly, to one utilizing a differential piston principle to provide larger output flow to the brake relative to the input flow from the brake valve.

BACKGROUND ART

Hydraulic brake slack adjusters are commonly used between the brake valve and the brake mechanism to maintain a minimum clearance between the stationary and rotating brake elements. Such slack adjusters heretofore have utilized pistons having identical working areas on opposite sides thereof such that the output flow to the brake is identical to the input flow from the valve. One of the problems encountered therewith is that the advent of larger machines requires higher brake fluid flows and thus a larger pump to maintain sufficient brake operating speeds. However, continuously driving a larger pump to provide the sufficient brake operating speed consumes a greater amount of available horsepower from the engine of the machine. Thus, what is needed is a slack adjuster which provides equivalent brake operating speeds with a smaller pump.

The present invention is directed to overcoming one or more of the problems as set forth above.

DISCLOSURE OF THE INVENTION

In one aspect of the present invention, a hydraulic brake slack adjuster includes a housing having first and second concentric bores, a valve port and a brake port. A piston assembly has a first piston portion slidably disposed in the first bore defining a first chamber continuously communicating with the valve port and having a first working area. A second piston of the piston assembly is connected to the first piston and is slidably disposed in the second bore defining a second chamber continuously communicating with the brake port. The second piston has a second working area less than the first working area.

BRIEF DESCRIPTION OF THE DRAWING

The sole FIGURE is a schematic/diagrammatic illustration of an embodiment of the present invention.

BEST MODE FOR CARRYING OUT THE INVENTION

A hydraulic brake slack adjuster 10 is shown in combination with a brake system 11. The brake system includes a pump 12 and an accumulator 12a connected to a brake valve 13 connected to the slack adjuster 10. The slack adjuster 10, in turn, is connected to a pair of hydraulically actuated spring released brakes represented by a pair of actuators 14 each having an actuator chamber 16 and a return spring 17.

The slack adjuster includes a composite body having a bore 18 disposed between a pair of axially aligned bores 19, a valve port 21 connected to the brake valve 11 and a pair of brake ports 22 connected to the actuating chambers 16.

Each of a pair of piston assemblies 23 has a piston 24 slidably disposed within the bore 18 defining a common chamber 26 therebetween. Both piston 24 have a working area 27 exposed to brake fluid within the chamber 26. The piston assemblies also include another piston 28 connected to the first piston and slidably disposed within the bores 19 defining a pair of chambers 29 continuously communicating with the brake ports 22. Both pistons 28 have a working area 31 exposed to fluid within the chambers 29 with the area of working areas 27 being less than the area of the working areas 31. Another pair of chambers 32 continuously communicate with a vent port 33. A spring 34 is disposed between the piston assemblies to bias them toward the position shown.

Each piston 24 includes a pair of axially extending passages 3B continuously communicating with the chamber 26. Each piston 28 includes an axially extending passage 36 continuously communicating with the brake port 22. Each brake assembly has a fluid replenishing valve 37 slidably disposed within the piston 24 and normally urged into engagement with a protrusion 39 of the piston 28 by a spring 41 disposed within an air chamber 42 separated from the brake fluid by suitable seals 43. Each piston 24 has an annular flange 44 seated within a bore 46 of each piston 28 and retained therein by a means 47 for connecting the piston 24 to the piston 28 for unitary movement therewith.

Industrial Applicability

The piston assemblies 23 are shown in a first installed condition prior to applying the brakes. When the brake valve 13 is first actuated to direct brake fluid through the slack adjuster 10 after the slack adjuster is first installed, brake fluid from the brake valve passes through the passages 35. The pressure of the brake fluid quickly exceeds a predetermined level to unseat the replenishing valve 37 and passes through the passage 36 and the brake port 22 to the actuator chambers 16. The piston assemblies 23 initially essentially remain in the position shown due to the force exerted by the spring 34 and the pressure in the chamber 26. The braking force is controlled by controlling the pressure in the chamber 26 with the brake valve 13.

Releasing the brake is accomplished by moving the brake valve 13 to the position shown venting the chamber 26. This allows the replenishing valve to move back into blocking engagement with the protrusion and the return springs 17 to force brake fluid from the chambers 16 and back into the slack adjuster 10. The springs 41 and 34 are selected so that a lesser pressure is required to move the piston assemblies 23 against the bias of the spring 34 than to unseat the replenishing valve. Thus, the fluid expelled from the actuator chambers 16 enters the chambers 29 and moves the valve assemblies inwardly toward each other until the pistons 28 bottom against a stop 49. The volumetric volume of the chambers 29 and actuator chambers are selected so that a minimum clearance is automatically established between the rotating and non-rotating elements of the brake assembly.

When the brakes are again applied, the brake fluid entering the chamber 26 acts on the working area 27 of the pistons 24, thereby forcing the brake fluid from the chambers 29 to the chambers 16 for again applying the brakes. Due to the differential area between the working areas 27 and 31, the volumetric volume of the brake fluid being outputted from each of the chambers 29 is less than the volumetric fluid required for moving each of the piston assemblies.

In view of the above, it is readily apparent that the structure of the present invention provides an improved slack adjuster in which the volume of brake fluid outputted to the brakes ms greater than the brake fluid being inputted to the slack adjuster from the brake valve. This would then permit a smaller pump to be used while maintaining sufficient brake operating speed.

Other aspects, objects and advantages of this invention can be obtained from a study of the drawing, the disclosure and the appended claims.

We claim:

1. A hydraulic brake adjuster for a hydraulically actuated spring released brake comprising:

a housing having first and second axially aligned bores, a valve port, and a brake port; and a piston assembly disposed between the valve port and the brake port and having a first piston slidably disposed within the first bore defining a first chamber continuously communicating with the valve port and having a first working area, and a second piston mechanically connected to the first piston for unitary movement therewith and slidably disposed within the second bore defining a second chamber continuously communicating with the brake port, the second piston having a second working area greater than the first working area.

2. The slack adjuster of claim 1 wherein the second piston has a bore, and the first piston has a radially extending flange seated in the bore in the second piston and including means for connecting the second piston to the flange of the first piston.

* * * * *